United States Patent
Lutich (10) Patent No.: US 10,198,550 B2
(45) Date of Patent: Feb. 5, 2019

(54) SRAF INSERTION WITH ARTIFICIAL NEURAL NETWORK

(71) Applicant: GLOBALFOUNDRIES INC., Grand Cayman (KY)

(72) Inventor: Andrey A. Lutich, Dresden (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 42 days.

(21) Appl. No.: 15/478,377

(22) Filed: Apr. 4, 2017

(65) Prior Publication Data
US 2018/0285510 A1    Oct. 4, 2018

(51) Int. Cl.
G06F 17/50        (2006.01)
G03F 1/36         (2012.01)

(52) U.S. Cl.
CPC ............ *G06F 17/5081* (2013.01); *G03F 1/36* (2013.01)

(58) Field of Classification Search
CPC .............................. G06F 17/5081; G03F 1/36
See application file for complete search history.

(56) References Cited

U.S. PATENT DOCUMENTS

| | | |
|---|---|---|
| 8,327,312 B2 | 12/2012 | Hurley et al. |
| 8,490,034 B1 | 7/2013 | Torunoglu et al. |
| 8,938,696 B1 | 1/2015 | Torunoglu et al. |
| 2010/0325591 A1* | 12/2010 | Lippincott .......... G06F 17/5072 716/54 |
| 2017/0262565 A1* | 9/2017 | Kodama .................. G03F 1/36 |

OTHER PUBLICATIONS

Xu et al., A Machine Learning Based Framework for Sub-Resolution Assist Feature Generation, ISPD '16, 2016, 161-168.
Xu et al., A Machine Learning Based Framework for Sub-Resolution Assist Feature Generation, 28 pages. @2016, ACM.

* cited by examiner

*Primary Examiner* — Nha T Nguyen
(74) *Attorney, Agent, or Firm* — Anthony Canale; Hoffman Warnick LLC (57) ABSTRACT

Embodiments of the disclosure provide a method including: identifying a target feature in an integrated circuit (IC) layout not represented in a library, the library including a plurality of sub-resolution assist feature (SRAF) usefulness maps corresponding to a plurality of features and SRAFs in the IC layout; generating a usefulness map for the target feature with an artificial neural network (ANN), the generating being based on the target feature and the plurality of SRAF usefulness maps in the library; adding the target feature and the generated usefulness map to the library; selecting an SRAF insertion site for the target feature based on the generated usefulness map; and inserting an SRAF for the target feature into the IC layout at the selected SRAF insertion site.

20 Claims, 7 Drawing Sheets

SRAF INSERTION WITH ARTIFICIAL NEURAL NETWORK

BACKGROUND

Technical Field

The present disclosure relates to integrated circuits (ICs). More specifically, the present disclosure relates to processes for creating and adjusting models of IC layouts.

Related Art

Fabrication foundries ("fabs") can manufacture ICs using photolithographic processes. Photolithography is an optical printing and fabrication process by which patterns on a photolithographic mask (i.e., photomask) are imaged and defined onto a photosensitive layer coating of a substrate. To fabricate an IC, photomasks are created using an IC layout as a template. The photomasks contain the various geometries (i.e., features) of the IC layout, and these geometries can be separated with layers of photoresist material. The various geometries contained on the photomasks correspond to the various base physical IC elements that make up functional circuit components such as transistors, interconnect wiring, via pads, as well as other elements that are not functional circuit elements but are used to facilitate, enhance, or track various manufacturing processes. Through sequential use of the various photomasks corresponding to a given IC in an IC fabrication process, a large number of material layers of various shapes and thicknesses with different conductive and insulating properties may be built up to form the overall IC and the circuits within the IC layout.

As integrated circuit (IC) components have continued to decrease in size, improvements to scale have spawned design implementation issues for some types of features, e.g., in complementary metal-oxide-semiconductor (CMOS) ICs with features sized less than approximately twenty-two nanometers (nm). As IC technology continues to shrink, the growing need for empirical data from a design may exacerbate the uncertainty of the manufacturing process, thereby increasing the risk of defects or impaired operability. Conventional approaches for traversing physical limits may apply manual or computer-implemented techniques for increasing the resolution of chips printed using optical lithography. One such technique is known as optical proximity correction (OPC). OPC is a computational method for correcting irregularities and distortions arising from diffraction effects by the transforming of mask geometries.

An OPC model of an IC layout may include one or more sub-resolution assist features (SRAFs), also known as "scattering bars," solely to improve the printability of isolated features. SRAFs take advantage of the fact that an isolated feature in an OPC model will typically print at a feature size significantly different from similarly positioned features that are in close proximity with other features. An SRAF may be included in a mask near a relatively isolated target feature to affect the printing density of the target feature, e.g., to cause the targeted feature to behave more like a dense feature after being printed, and/or to change the position of the projected edges in the target feature. SRAFs are structured such that their intensity profiles are not below a threshold dose for fabricating an IC structure, and thus are considered to be "sub-resolution" features. The presence of an SRAF near the target feature will affect nearby printed features, without the SRAF actually being printed. Selecting positions for SRAF insertion into an IC layout can be time-consuming. In particular, SRAF insertion is conventionally performed via manual inspection and/or special case mathematical models due to substantial physical differences between features, IC layouts, products, etc. Conventional models do not offer a predictable and cost-effective way to automatically predict and select locations for SRAFs to improve the printability of nearby features.

SUMMARY

A first aspect of the present disclosure provides a method including: identifying a target feature in an integrated circuit (IC) layout not represented in a library, the library including a plurality of sub-resolution assist feature (SRAF) usefulness maps corresponding to a plurality of features and SRAFs in the IC layout; generating a usefulness map for the target feature with an artificial neural network (ANN), the generating being based on the target feature and the plurality of SRAF usefulness maps in the library; adding the target feature and the generated usefulness map to the library; selecting an SRAF insertion site for the target feature based on the generated usefulness map; and inserting an SRAF for the target feature into the IC layout at the selected SRAF insertion site.

A second aspect of the present disclosure provides a computer program product stored on a computer readable storage medium, the computer program product including program code, which, when being executed by at least one computing device, causes the at least one computing device to: identify a target feature in an integrated circuit (IC) layout not represented in a library, the library including a plurality of sub-resolution assist feature (SRAF) usefulness maps corresponding to a plurality of features and SRAFs in the IC layout; generate a usefulness map for the target feature with an artificial neural network (ANN), the generating being based on the target feature and the plurality of SRAF usefulness maps in the library; add the target feature and the generated usefulness map to the library; select an SRAF insertion site for the target feature based on the generated usefulness map; and insert an SRAF for the target feature into the IC layout at the selected SRAF insertion site.

A third aspect of the present disclosure provides a system including: at least one computing device configured to perform a method by performing actions including: identify a target feature in an integrated circuit (IC) layout not represented in a library, the library including a plurality of sub-resolution assist feature (SRAF) usefulness maps corresponding to a plurality of features and SRAFs in the IC layout; generate a usefulness map for the target feature with an artificial neural network (ANN), the generating being based on the target feature and the plurality of SRAF usefulness maps in the library; add the target feature and the generated usefulness map to the library; select an SRAF insertion site for the target feature based on the generated usefulness map; and insert an SRAF for the target feature into the IC layout at the selected SRAF insertion site.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Introduction and General Definitions

Embodiments of the disclosure can use machine-learning techniques for image recognition, interpretation and processing to automatically insert sub-resolution assist features (SRAFs) into integrated circuit (IC) layouts, and enable fabrication of a circuit using those layouts. Embodiments of the disclosure include systems, computer program products and methods employing an artificial neural network (ANN) to automatically select and insert SRAFs at locations which are likely to improve the printability of a nearby feature. Further embodiments can include iteratively training the ANN with information from previously fabricated IC structures and/or inserted SRAFs to aid SRAF insertion.

To better illustrate the various embodiments of the present disclosure, particular terminology which may be known or unknown to those of ordinary skill in the art is defined to further clarify the embodiments set forth herein. The term "system" can refer to a computer system, server, etc., composed wholly or partially of hardware and/or software components, one or more instances of a system embodied in software and accessible a local or remote user, all or part of one or more systems in a cloud computing environment, one or more physical and/or virtual machines accessed via the internet, other types of physical or virtual computing devices, and/or components thereof.

The term "IC layout" can refer to a digital rendering or similar representation of a complete or partial IC chip which includes a plurality of circuit features (simply "features" hereafter) which may be stored, e.g., in a memory component of a computer system. A "region" refers to any subset of a given IC layout. A "pattern" refers to a representation of one or more features in an IC layout, which may be transferred from the memory of a computer system onto a mask by way of, for example, direct-write electron beam lithography. Optical proximity correction (or "OPC") generally refers to a process by which an IC layout is modeled for printing by converting a set of ideal feature patterns into corrected feature shapes to account for one or more printing errors.

A "shape" or "feature shape" refers to an estimated printing region of a given pattern in an OPC model, which may account for printing errors or related constraints. A "feature" generally refers to a functional element in an IC layout (e.g., a wire) which must be printed on a wafer using photolithography techniques. A "sub-resolution assist feature (SRAF)," also known as a "scattering bar," refers to a feature included in an IC layout solely to improve the printability of isolated features. SRAFs take advantage of the fact that an isolated feature in an OPC model will typically print at a feature size significantly different from similarly positioned features which are in close proximity with other features, e.g., to increase the size or adjust the edges of other features.

Circuit fabrication with SRAF Usefulness Maps

Figure 1:
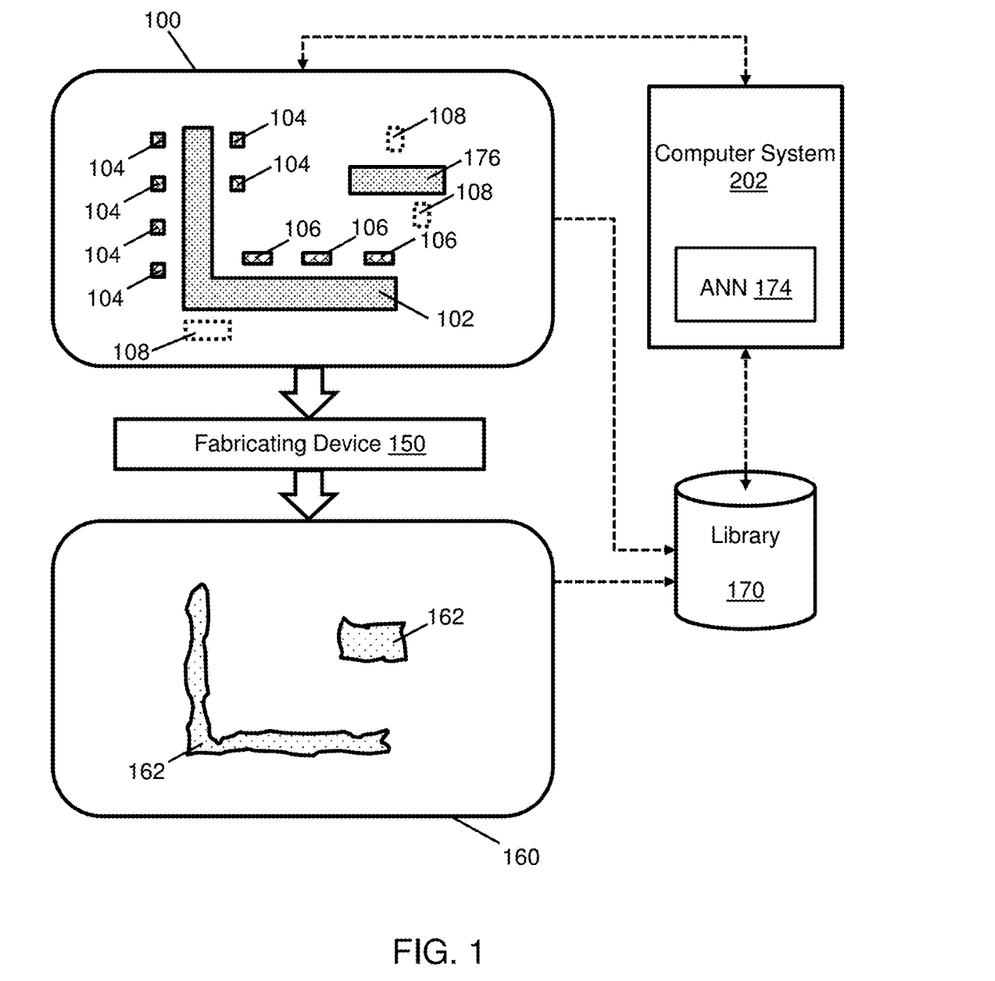
FIG. 1 provides a schematic data flow diagram of components and processes for inserting SRAFs into an IC layout according to embodiments of the disclosure.

FIG. 1 provides schematic a schematic data flow diagram of components and processes for inserting SRAFs into an IC layout according to embodiments of the disclosure. FIG. 1 illustrates a proposed IC layout 100 indicative of at least a portion of a product to be modeled and manufactured using optical proximity correction (OPC). Proposed IC layout 100 can include features 102 to be printed at various positions. A single feature 102 is shown in proposed IC layout 100 for the purposes of demonstration only, and it is understood that proposed IC layout 100 of FIG. 1 can represent only a portion of a larger IC layout to be printed. More specifically, IC layout 100 depicted in FIG. 1 can represent a single region of proposed IC layout 100. Each region of IC layout 100 may include multiple features 102, which are in close physical proximity relative to other patterns, and/or may be functionally interrelated or designed to be manufactured together. In some cases, proposed IC layout 100 may include only a select group of regions and associated features 102, which may provide a group of empirical data for OPC.

As shown, proposed IC layout 100 can include a first set of SRAFs 104 and a second set of SRAFs 106, e.g., having respective sizes and effects on the printing of features 102. SRAFs 104, 106 are included in proposed IC layout 100 nearby features 102 to affect the printing thereof, e.g., by increasing the thickness, length, etc., of nearby features 102 due to proximity effects of various fabricating devices used to yield an IC product. SRAFs 104, 106 may be of a size that prevents them from being physically generated upon fabrication of a product. SRAFs 104, 106 may work as intended during fabrication of a device, e.g., by affecting the printability of features 102, but not actually being printed during manufacture. It is understood that some features 102 in proposed IC layout 100, or portions thereof, may not have associated SRAFs 104, 106. To this extent, the possible location of one or more SRAFs can be identified as an SRAF insertion site 108. SRAF insertion sites 108 for features 102 may be chosen manually in conventional processes, but embodiments of the present disclosure can automatically identify SRAF insertion sites 108 where SRAF(s) 104, 106 can be added as described herein.

A fabricating device 150 (e.g., a single fabricating plant and/or a group of interconnected devices for producing a fabricated circuit 160 from a proposed layout) can be operable to receive proposed IC layout 100 and yield fabricated circuit 160 based on proposed IC layout 100. Fabricated circuit 160 can include one or more printed features 162 formed based on, e.g., feature(s) 102 of proposed IC layout 100. Fabricating device 150 can be operable to, e.g., cause manufacture of one or more circuit elements at positions designated with features 102 in proposed IC layout 100. As discussed elsewhere herein, the position of SRAFs 104, 106 in proposed IC layout 100 can affect the size, shape, etc., of printed features 162 in fabricated circuit 160.

To aid in the placement and effectiveness of SRAF insertion, some manufacturers may rely upon SRAF usefulness maps. These usefulness maps are the visualized predictions of how SRAF(s) 104, 106 may affect the printability of nearby features 102. As discussed herein, usefulness maps can describe net effect of an elementary SRAF insertion in the proximity of an isolated arbitrary target shape, and using a usefulness map generally includes two steps: (i) generating an SRAF usefulness map for an arbitrary layout comprised of OPC target shapes from an IC layout and (ii) derivation of design rule check (DRC) compliant SRAF shapes from those usefulness maps. Systems according to various embodiments of the disclosure can include a library 170 of usefulness maps for one or more IC layouts 100, and which may include representations of features 102 and/or SRAFs 104, 106. In accordance with embodiments of the disclosure, library 170 is connected to, and modified by an artificial neural network (ANN) 174 which can be trained according to a subset of the limited usefulness library described above. According to a further example, library 170 can include a group of usefulness maps 180 (example shown in FIG. 2) provided as initial samples, regardless of whether they are included in proposed IC layout 100 and/or different proposed IC layouts 100. Embodiments of the disclosure can also include a computer system 202 in communication with library 170, e.g., according to any currently-known or later developed solution for communicating between data repositories (e.g., library 170), computer systems (e.g., computer system 202), and/or other data repositories discussed herein.

Computer system 202 is configured to insert SRAFs 104, 106 into one or more proposed IC layouts 100, e.g., constructing, training, and/or applying ANN 174. ANN 174 can be operable to insert SRAFs into proposed IC layout(s) 100 by identifying a target feature 176 which does not have a corresponding shape or usefulness map in library 170, selecting an SRAF insertion site for feature 102 based on characteristics of target feature 176 and usefulness maps in library 170, generating a usefulness map for target feature 176 with ANN 174, adding target feature 176 and selected SRAF insertion site to library 170, inserting an SRAF for feature 102 into IC layout 100 at the selected site, and, optionally, automatically fabricating an IC structure based on IC layout 100 which includes the inserted SRAF(s). To expand the training data for ANN 174, usefulness maps included within library 170 can be translated along one or more axes to provide additional usefulness map examples for comparison, training, and/or to predict usefulness maps for new features. Training ANN 174 with computer system 202 can include, e.g., adding the inserted SRAF(s) 104, 106 and/or target features 176 to library 170 for future use, e.g., to account for features that were not previously included in library 170. In this manner, computer system 202 can provide a process methodology for automatically selecting SRAF insertion sites 108 and inserting new SRAFs 104, 106 into proposed IC layout(s) 100 without manual analysis and/or decisions by a user.

Figure 2:
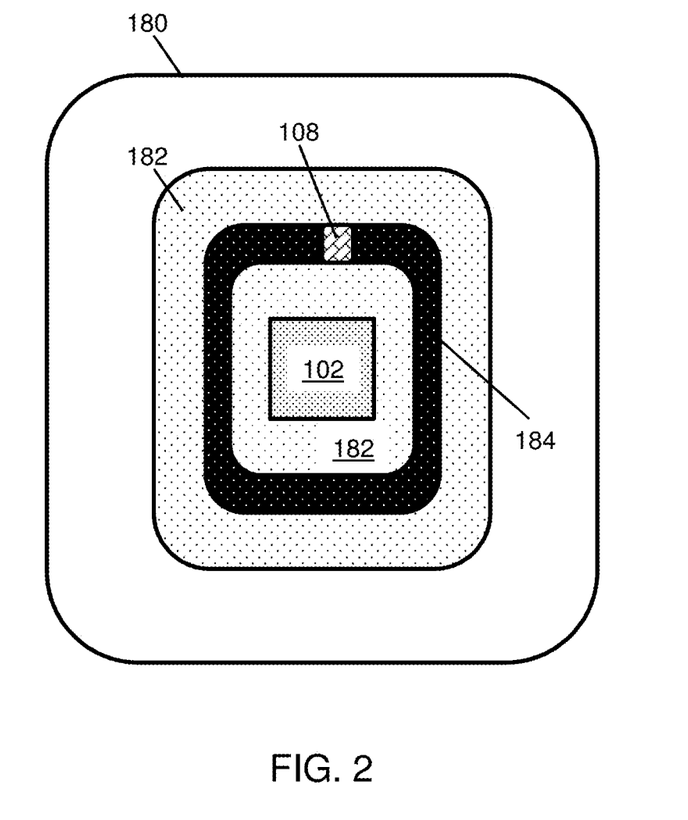
FIG. 2 provides a plan view of a usefulness map for SRAF insertion according to embodiments of the disclosure.

Referring to FIG. 2, an example of an SRAF usefulness map (simply "usefulness map," hereafter) 180 for feature 102 is shown to illustrate processes for selecting SRAF insertion site(s) 108. As noted herein, usefulness map(s) 180 provide a visual metric for illustrating the influence of an SRAF on the manufacturability of feature(s) 102 when SRAFs are included in proposed IC layout 100 at one or more positions. The use of libraries 170 of usefulness maps 180 can result in significant runtime reduction and higher quality of SRAFs 104, 106 in proposed IC layout 100. Usefulness map 180 depicted in FIG. 2 may represent one of a plurality of usefulness maps 180 provided within library 170, each corresponding to respective features 102 in proposed IC layout 100. Usefulness map(s) 180 can visually represent an effect on the photolithography performance of inserting SRAF(s) 104, 106 at a given position within the vicinity of particular feature(s) 102. Any conceivable image printability metric or a combination of several metrics can be used to define the value of usefulness. Positive values of usefulness, e.g., can correspond to widening of a process variability band (pv-band), negative—to narrowing. In this case, the more negative the usefulness becomes, the more favorable is placement of SRAF(s) 104, 106 at a given location.

However constructed, usefulness map(s) 180 can predict the effects of SRAF placement in the proximity of feature(s) 102. In the above example, an improvement in usefulness could be associated with a change in one or more printability metrics, e.g., the pv-bandwidth. Pre-existing features 102 and usefulness maps 180 included in library 170 can be used to construct new usefulness map(s) for IC layout 100, e.g., by combining multiple shapes by linear (or non-linear) addition and/or superposition. Library 170 may initially compiled from a limited number of usefulness maps 180, but processes described herein can expand the training data for ANN 174, e.g., by increasing the total number of usefulness maps 180 included in library 170 as discussed herein.

Usefulness maps 180 in library 170 may have be provided manually by a user, optionally with the aid of one or more independently implemented computer implemented processes, algorithms, etc., for simulating the effect of SRAFs on printability of feature(s) 102. Usefulness map 180 can be divided into multiple areas based on the projected effect of an SRAF on feature 102. Usefulness map 180 can include, e.g., one or more excluded zones 182 where adding SRAF(s) 104, 106 will negatively affect the printability of feature(s) 102 in usefulness map 180. Candidate zones 184, by contrast, represent regions of usefulness map 180 where adding SRAF(s) 104, 106 to IC layout 100 (FIG. 1) will improve the printability of feature(s) 102. The distinction between excluded zones 182 and candidate zones 184 can be based on, e.g., one or more independent simulations, calculations, etc., for whether an SRAF being included in a particular location will improve or reduce the printability of relevant feature(s) 102. Usefulness map 180 can therefore allow a user, predictive algorithm, etc., to select one or more SRAF insertion sites 108 in candidate zone(s) 184 where SRAF(s) 104, 106 can be added to IC layout 100. Embodiments of the present disclosure can apply usefulness maps 180 in library 170 (FIG. 1), regardless of the specific processes used to define excluded zones 182 and/or candidate zones 184.

Generating Usefulness Maps with ANN

Figure 3:
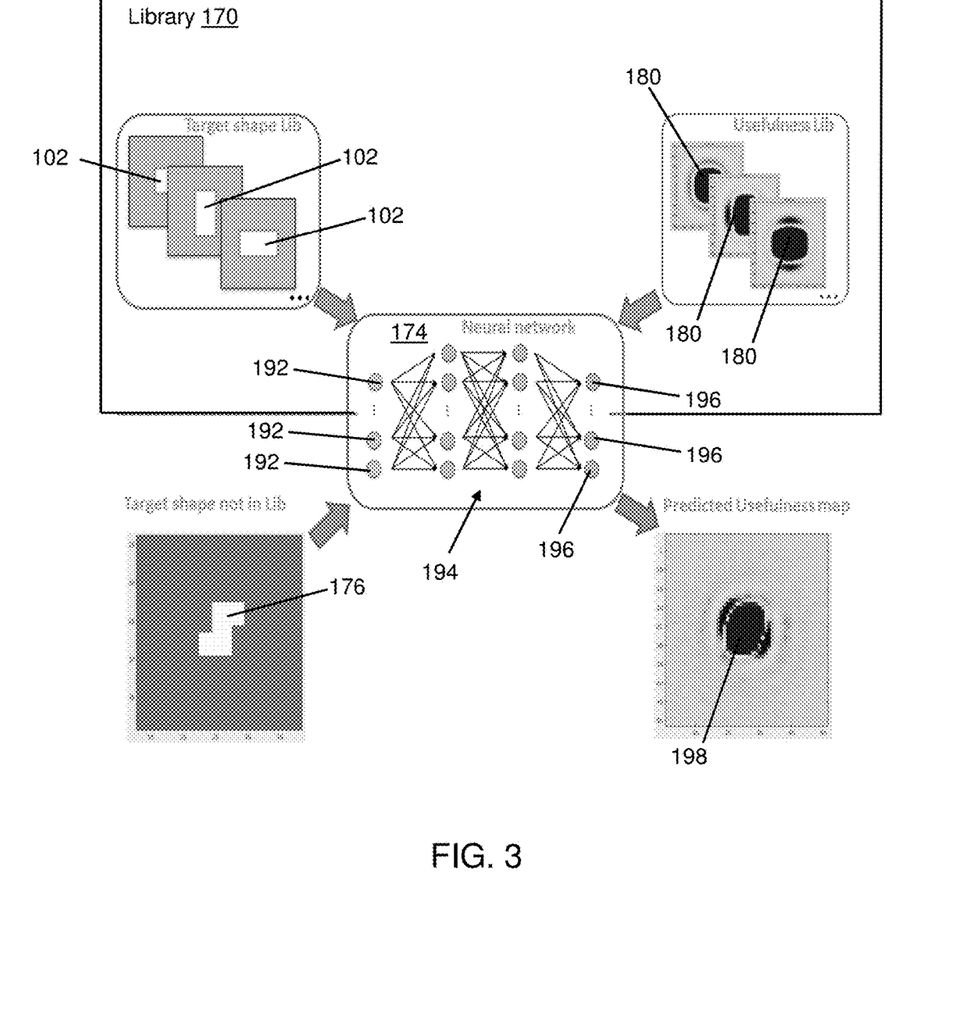
FIG. 3 provides a schematic process diagram illustrating a method of using an ANN to generate a usefulness map for SRAF insertion according to embodiments of the disclosure.

Turning to FIG. 3, a schematic diagram illustrating processes of training and using ANN 174 are shown to further illustrate the application of usefulness maps 180 in embodiments of the present disclosure. ANN 174 can provide (e.g., by machine learning) a model which relates one or more input variables to a particular output variable. As successive groups of inputs are provided to ANN 174, the created model can be adjusted based on comparing various outputs to verified, ideal values and/or other related groups of inputs and outputs. Inputs 192 denote a group of inputs provided to ANN 100 which can include, e.g., one or more predetermined features 102 and/or usefulness maps 180 in library 170, in addition to the characteristics of target feature(s) 176 not included in library 170. Inputs 192 can together define an input layer of ANN 174 represented by one or more nodes. Each node and respective input 192 can in turn be connected to other nodes in a hidden layer 194, which represent particular mathematical functions. In embodiments of the present disclosure, inputs 192 can include, e.g., one or more usefulness maps 180 for features 102 included in IC layout 100 and/or other IC layouts. Each node of hidden layer 194 can include a corresponding weight representing a factor or other mathematical adjustment for converting input variables into output variables. The nodes of hidden layer 194 can eventually connect to one or more output nodes 196 node of an output layer, which provides one or more output quantities, maps, etc., based on inputs 192. In embodiments of the disclosure, outputs from ANN 174 can include, e.g., one or more predicted usefulness maps 198 which may include machine-generated excluded zones 182 (FIG. 2), candidate zones 184 (FIG. 2), and/or SRAF insertion sites 108 based on such zones.

To increase the effectiveness of ANN 174, outputs 196 can be compared with predetermined or target (e.g., ideal) values to calculate errors in a process known as "error backpropagation." Where the error between various outputs 196 and a predetermined value exceeds a particular threshold, ANN 174 can include processes for self-correction. For example, process steps encoded in hardware and/or software can use outputs 196 to adjust weights W of hidden layer 194 and or connections between inputs 192 to and hidden layer 194. In an example embodiment, error backpropgagation can include "Bayesian Regulation," a series of mathematical steps leveraging probability for weight calculations in order to minimize the mean squared error (MSE) (i.e., the squared value of the difference between an output and a predetermined value, whether positive or negative) between values of output(s) 196 and the predetermined values. Bayesian Regulation can help generalize the various mathematical models in ANN 174 to avoid over fitting experimental data to a particular model. Thus, ANN 174 can develop and adjust models by processing multiple inputs 192 to calculate outputs 196 and compare outputs 196 to predetermined or expected values.

ANN 174 can take the form of one or more sub-classifications of ANN architectures, whether currently-known or later developed. In one example, ANN 174 can take the form of a "convolutional neural network," for generating images (e.g., predicted usefulness map(s) 198) from base images (e.g., features 102 in proposed IC layout 100, and/or usefulness maps 180). Convolutional neural networks may be distinguished from other neural network models, e.g., by including individual nodes in each layer which respond to inputs in a restricted region of a modeled space known as "a receptive field." The receptive fields of different nodes and/or layers can partially overlap such that they together form a tiled depiction of a visual field (e.g., usefulness map(s) 180 in X-Y space). The response of an individual node to inputs within its receptive field can be approximated mathematically by a convolution operation. In another example, ANN 174 can take the form of a multilayer perceptron (MLP) neural network. MLP neural networks may be distinguished from other neural networks, e.g., by mapping sets of input data onto corresponding sets of outputs by way of a directed graph. MLP neural networks can rely upon automatic supervised learning, e.g., through one or more backpropagation processes described herein. MLP neural networks may be particularly suitable for sets of data which may be not linearly separable by conventional mathematical techniques. Regardless of the chosen architecture of ANN 174, the training processes implemented, e.g., with training system 230 can be similar or identical.

Figure 4:
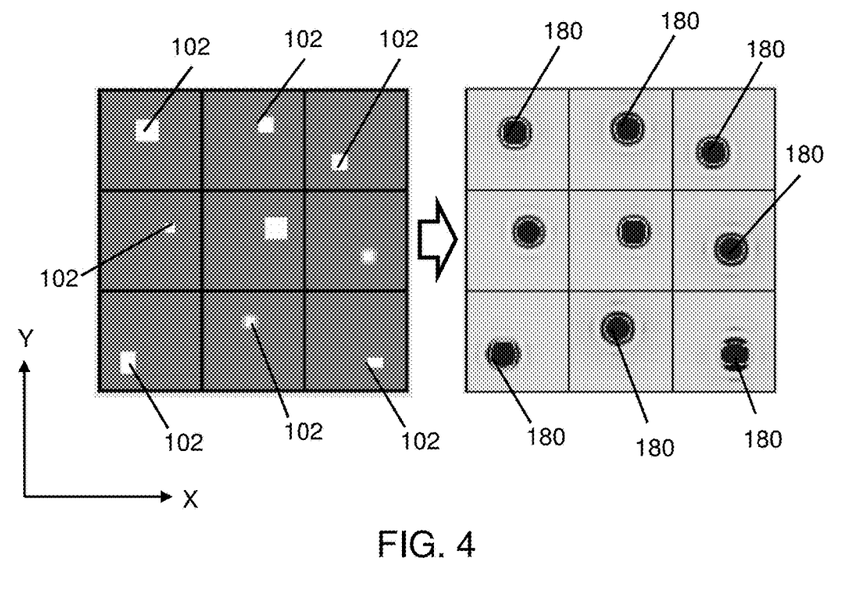
FIG. 4 provides a schematic process diagram illustrating a method of training an ANN with translated SRAF usefulness maps according to embodiments of the disclosure.

Turning to FIG. 4, an example data flow diagram is shown, illustrating a process of increasing the number of features 102 and usefulness maps 180 in library 170 according to additional aspects of the disclosure. Usefulness maps 180 in library 170 may each correspond to features 102 a single proposed IC layout 100 or may correspond to features 102 ion multiple proposed IC layouts 100. Furthermore, usefulness maps 180 can be separately created based on previously fabricated circuits 160 (FIG. 1), e.g., in an independent process. The quality of outputs 196 (FIG. 3) from ANN 174 (FIGS. 1, 3), e.g., predicted usefulness maps 198 (FIG. 3) can depend at least partially on the number of features 102 and usefulness maps 180 represented in library 170. Typically, training ANNs (e.g., ANN 174) require large amounts of training data to provide sufficient prediction accuracy. Thousands to hundred thousands of training examples may be needed to train such a network. Generating datasets sufficient to train ANN 174 can be a challenge. In some cases, embodiments of the disclosure can also artificially increase the amount of training data in library 170 by making use of the translational invariance property of usefulness maps 180. More specifically, it has been determined that translating feature(s) 102 along one or more reference axes relative to its initial position will cause an identical translation in its associated usefulness map 180 without having other effects.

To increase the amount of features 102 and usefulness maps 180 without running additional simulations, embodiments of the disclosure can include approaches for randomly translating one or more features 102 and/or usefulness maps 180 in an X-Y plane to automatically create new features 102 and/or usefulness maps 180 for library 170. As noted elsewhere herein, it has been determined that translational movement of features 102 in X-Y space can result in an identical translation of the corresponding usefulness map(s) 180. An initial dataset may include a limited number (e.g., forty-seven) of pre-calculated SRAF usefulness maps 180 included within usefulness map library. This number may be randomly split into training examples (e.g., thirty-one maps) and verification examples (e.g., sixteen). Then, the amount of training data may be multiplied (e.g., by one-hundred) to become a much larger amount (e.g., more than three-thousand) by randomly shifting the training examples in along X-axis and or Y-axis to provide a predetermined number of translation iterations. Thereafter, ANN 174 can compare the additional usefulness maps created from the training examples against the verification examples to make further adjustments to underlying nodes and layers. The expanded library 170 can then be used to automatically select locations where SRAFs may be added to an IC layout, e.g., by superimposing one or more of the translated or non-translated usefulness maps onto each other and thereby produce predicted usefulness map(s) 198 for target feature(s) 176.

Notwithstanding this property of features 102 and usefulness maps 180, changing the position of features 102 and/or usefulness maps 180 in X-Y space can improve the amount of training data for ANN 174 and/or the ability to generate predicted usefulness maps 198 for features 102 not included in library 170. As shown in FIG. 4, computer system 202 can train ANN 174 by expanding the number of features 102 and usefulness maps 180 in library 170, by translating (randomly, pseudo-randomly, or deterministically) existing features 102 and usefulness maps 180 to create new features 102 and usefulness maps 180 for library 170. An example of such translation is shown in FIG. 4 to illustrate how several new features 102 and usefulness maps 180 can be created from a relatively small sample size.

Computer System and Example Components

Figure 5:
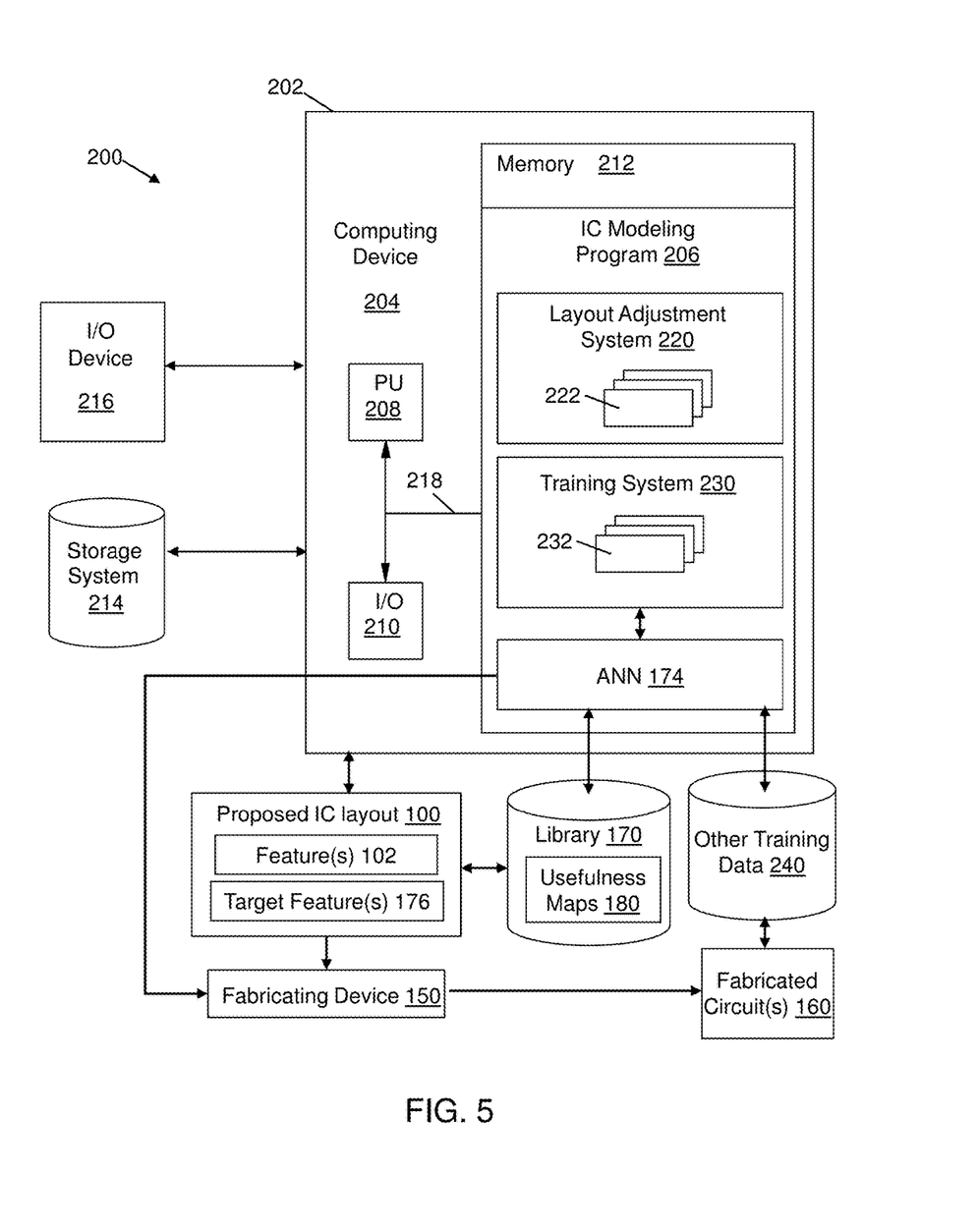
FIG. 5 depicts an illustrative environment, which includes a computer system configured to interact with a fabricating device and a training data repository to insert SRAFs in an IC layout according to embodiments of the disclosure.

Turning now to FIG. 5, an illustrative environment 200 for implementing the methods and/or systems described herein is shown. In particular, a computer system 202 is shown as including a computing device 204. Computing device 204 can include, e.g., an IC modeling program 206 which may include, e.g., one or more sub-systems (layout adjustment system 220 and/or training system 230 described herein) for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 can execute program code, such as IC modeling program 206, which is at least partially fixed in memory 212. While executing program code, processing unit 208 can process data, which can result in reading and/or writing data from/to memory 212 and/or storage system 214. Pathway 218 provides a communications link between each of the components in environment 200. I/O component 210 can comprise one or more human I/O devices, which enable a human user to interact with computer system 202 and/or one or more communications devices to enable a system user to communicate with the computer system 202 using any type of communications link. To this extent, IC modeling program 206 can manage a set of interfaces (e.g., graphical user interface(s), application program interface(s), etc.) that enable system users to interact with IC modeling program 206. Further, IC modeling program 206 can manage (e.g., store, retrieve, create, manipulate, organize, present, etc.) data, through several modules contained within a layout adjustment system 220 (i.e., modules 222) and/or a training system 230 (i.e., modules 232). Layout adjustment system 220 and training system 230 are shown by example as being sub-systems of IC modeling program 206. However, it is understood that layout adjustment system 220 and training system 230 may be wholly independent systems. Memory 212 of computing device 204 is also shown to include ANN 174, though it is understood that ANN 174 may be included within one or more independent computing devices, programs, etc., in alternative embodiments.

As noted herein, IC modeling program 206 can include layout adjustment system 220 and training system 230. In this case, various modules 222 of layout adjustment system 220 and modules 232 of training system 230 can enable computer system 202 to perform a set of tasks used by IC modeling program 206, and can be separately developed and/or implemented apart from other portions of IC modeling program 206. Memory 212 can thus include various software modules 222, 232 of systems 220, 230 configured to perform different actions. Example modules can include, e.g., a comparator, a calculator, a determinator, etc. One or more modules 222, 232 can use algorithm-based calculations, look up tables, software code, and/or similar tools stored in memory 212 for processing, analyzing, and operating on data to perform their respective functions. Each module discussed herein can obtain and/or operate on data from exterior components, units, systems, etc., or from memory 212 of computing device 204.

Sets of modules 222, 232 of layout adjustment system 220 and training system 230 are shown to illustrate operation of computer system 202 according to various examples. Layout adjustment system 220 can include, e.g., modules 222 for identifying features in one or more fabricated circuits 160. During operation, layout adjustment system 220 can generate a database expressed, e.g., through a list, graphical representation, and/or other organizational structure of each feature 102 (FIG. 1) in proposed IC layout(s) 102. Layout adjustment system 220 can be operable to identify functional features, SRAFs, and/or other printable components in proposed IC layout 100. In addition, layout adjustment system 220 can quantify one or more metrics for each identified feature (e.g., length, width, surface area, printability, etc.). In further embodiments, layout adjustment system 220 can produce various outputs (e.g., predicted usefulness maps 198 (FIG. 3) based on one or more features 102 (FIGS. 1, 3-4) and/or usefulness maps 180 (FIGS. 2-4) in library 170. Such inputs can be provided to computing device 204, e.g., through I/O device 216. Some attributes of proposed IC layout 100 can be converted into a data representation (e.g., a data matrix with several values corresponding to particular attributes) and stored electronically, e.g., within memory 212 of computing device 204, storage system 214, and/or any other type of data cache in communication with computing device 204. Images and/or other representations of proposed IC layout 100, fabricated circuit 160, etc., can additionally or alternatively be converted into data inputs or other inputs to IC modeling program 206 with various scanning or extracting devices and/or manual entry of a user, e.g., by determining the dimensions of features 102 (FIG. 1), SRAFs 104, 106 (FIG. 1), measuring and/or determining topology measures (e.g., a polygon count, area density, and/or diffraction order coefficient), calculating a value of a printability metric based on the attributes of each feature in proposed IC layout 100, etc.

As discussed herein, IC modeling program 206, including ANN 174, can create predicted usefulness maps 198 (FIG. 3) using one or more target features 176 in proposed IC layout 100 and various forms of data in library 170 and/or other training data 240. As described elsewhere herein ANN 174 can include multiple layers of models, calculations, etc., each including one or more adjustable calculations, logical determinations, etc., through any currently-known or later developed analytical technique for predicting an outcome based on raw data. ANN 174 can therefore use feature(s) 102 and/or various data in library 170 and other training data 240 as an input to select one or more sites where SRAFs can be inserted into proposed IC layout 100 as discussed herein. Example processes executed with ANN 174 and/or IC modeling program 206 are discussed in detail elsewhere herein. Modules 222 of layout adjustment system 220 and modules 232 of training system 230 can implement one or more mathematical calculations and/or processes, e.g., to execute the machining learning and/or analysis functions of ANN 174.

As discussed herein, training system 230 can include a corresponding set of modules 232 for executing functions of IC modeling program 206, discussed herein. Modules 232 of training system 230 can include, e.g., a determinator for making logical determinations based on one or more inputs. Modules 232 of training system 230 can perform one or more actions relating to the training of ANN 174, e.g., submitting data from library 170, other training data 240, and/or memory 212 to expand the amount of reference data used by ANN 174. Other functions of modules 232 can include, e.g., translating features 102 (FIGS. 1, 3-4) and/or usefulness maps (FIGS. 2-4) along X-axis or Y-axis to create additional training data for ANN 174. Training system 230 can include modules 232 for "flagging" (e.g., marking, indexing, and/or otherwise identifying in data) various features 102 to indicate that they have been added to library 170 in other processes. Modules 232 of training system 230, in addition, can modify ANN 174 by adjusting variables, coefficients, weights threshold values, reference values, etc., based on the expansion of library 170. Modules 232 of training system 230 can also include a calculator for carrying out various mathematical operations, e.g., to adjust ANN 174 as prescribed by other processes. In other embodiments, modules 232 of training system 230 may be used to adjust ANN 174.

Computer system 202 can be operatively connected to or otherwise in communication with fabricating device 150 having one or more OPC-based fabrication tools, e.g., an OPC modeler, as part of the layout adjustment system 220 for converting proposed IC layouts 100 into instructions used by fabricating device 150 to create fabricated circuit(s) 160. Computer system 202 can thus be embodied as a unitary device in a semiconductor manufacturing plant coupled to, fabricating device 150 and/or other devices, or can be multiple devices each operatively connected together to form computer system 202. Embodiments of the present disclosure can thereby include using ANN 174 to select one or more SRAF insertion sites 108 (FIGS. 1-2), add SRAF(s) 104,106 to proposed IC layout 100 and the selected SRAF insertion sites 108, and thereafter manufacture one or more ICs based on proposed IC layout 100. As discussed herein, embodiments of the present disclosure thereby provide machine learning processes for automatically adding new SRAF(s) to proposed IC layout 100, and creating fabricated circuit(s) 160 using proposed IC layouts 100 which include the added SRAFs 104, 106.

Where computer system 202 comprises multiple computing devices, each computing device may have only a portion of IC modeling program 206, layout adjustment system 220, and/or training system 230 fixed thereon (e.g., one or more modules 222, 232). However, it is understood that computer system 202 and layout adjustment system 220 are only representative of various possible equivalent computer systems that may perform a process described herein. Computer system 202 can obtain or provide data, such as data stored in memory 212 or storage system 214, using any solution. For example, computer system 202 can generate and/or be used to generate data from one or more data stores, receive data from another system, send data to another system, etc.

Operational Methodology

Referring to FIGS. 1, 3, and 5-6 together, processes for analyzing IC layouts and inserting SRAFs into the IC layout according to the present disclosure are discussed. The steps and processes depicted in FIG. 6 can be implemented, e.g., with one or more modules 222 of layout adjustment system 220, modules 232 of training system 230, and/or other components of computer system 202 described herein by example. A single and/or repeated execution of the processes discussed herein can yield a machine learning process for repeatedly using ANN 174 to add SRAF(s) 104, 106 (FIG. 1) to proposed IC layout 100 and, e.g., further train ANN 174. In this manner, circuit designers may adjust future proposed IC layouts 100 to predict and/or continuously expand library 170 as discussed herein. In the example processes discussed herein, proposed IC layout 100 will generally be described as including at least two features 102 therein, with some alternative examples referring to proposed IC layouts with different numbers of features (e.g., one feature, four features, ten features, etc.). It is also understood that the present disclosure can be implemented with respect to multiple proposed IC layouts 100 simultaneously and/or sequentially, with each proposed IC layout including features 102 with any conceivable dimensions, in any conceivable number, etc., and that other examples are discussed herein where appropriate. The various processes discussed herein, furthermore, can be implemented before, after, or during OPC implementation on one or more fabricated circuits 160. It is also understood that one library 170 can be used for multiple proposed IC layouts 100 in embodiments of the disclosure, that multiple libraries 170 and/or ANNs 174 can be used for one proposed IC layout 100, and/or other embodiments may include further combinations of IC layouts 100, libraries 170, ANNs 174, etc.

Figure 6:
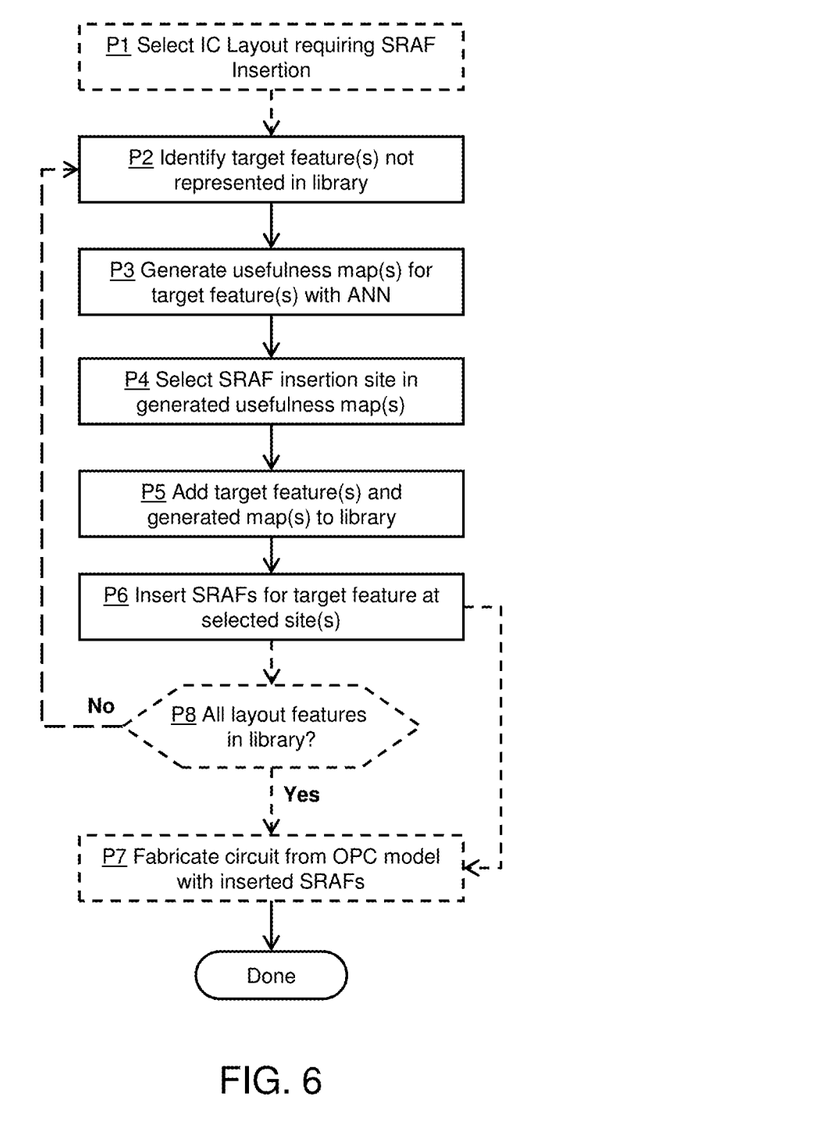
FIG. 6 is an example flow diagram of a method for inserting SRAFs into an IC layout with artificial neural network (ANN) according to embodiments of the disclosure.

In a preliminary action, IC modeling program 206 or a user thereof can optionally select one or more proposed IC layouts 100 for fabricating circuit structures as described herein. Process P1 is shown in phantom to illustrate this optional process according to embodiments. Each proposed IC layout 100 can include, e.g., features 102 and/or SRAFs 104, 106. Although features 102 and SRAFs 104, 106 are identified separately for clarity of explanation, IC modeling program 206 may indiscriminately consider features 102 and SRAFs 104, 106 to simply be identified as "features" in proposed IC layout 100. Further processes described herein can automatically insert SRAFs into proposed IC layout 100 selected in process P1. Proposed IC layout(s) 100 can be submitted to computer system 202, e.g., as inputs to I/O device 216 through a computer-readable storage medium and/or other computer-readable inputs to computer system 202.

Regardless of how IC layout 100 is selected, modules 222 of layout adjustment system 220 in process P2 can identify one or more features 102 in IC layout 100 that are not represented in library 170, e.g., as usefulness maps or previously analyzed features. According to an example, modules 222 of layout adjustment system 220 can identify target feature(s) 176 from features 102 by applying optical proximity correction (OPC) tools to extract one or more features 102 from IC layout 100. Such OPC tools can use rule-based and/or model-based correction techniques to modify patterns on a mask (or reticle) used in photolithographic processing of an IC structure. Identifying target feature(s) 176 in proposed IC layout 100 can also include, e.g., mapping techniques in which polygon edge fragments from a beginning reticle layout, corresponding to proposed IC layout 100, are iteratively manipulated into a corrected reticle layout for extracting target feature(s) 176 for embodiments of the disclosure. Target feature(s) 176 identified in process P2 may also be identified relative to features 102 based on the absence of one or more corresponding usefulness maps 180 for target feature(s) 176 in library 170. Embodiments of the disclosure can then generate usefulness maps 180 for target feature(s) 176 in other processes.

Regardless of the process for identifying target feature(s) 176 from feature(s) 102 in IC layout 100, embodiments of the disclosure can include automatically generating usefulness maps 180 for each target feature 176 with ANN 174. The generating of usefulness map(s) 180 for target feature(s) 176 can proceed according to the various ANN processing techniques described elsewhere herein relative to FIG. 3, e.g., submitting representations of target feature(s) 176, other features 102, previously-generated usefulness maps 180, and/or other training data 240 as inputs to ANN 174, which can apply various equations, algorithms, models, etc., at various nodes to yield predicted usefulness map(s) 198 for each target feature 176 as the generated usefulness map 180. As discussed elsewhere herein relative to FIGS. 2-3, each predicted usefulness map 180 generated with ANN 174 can include, e.g., excluded zones 182 and candidate zones 184 for SRAF insertion in subsequent processes. Embodiments of the disclosure can generate usefulness map(s) 180 (e.g., predicted usefulness map(s) 198) for target feature(s) 176 with ANN 174 without directly simulating the fabrication of target feature(s) 176, but instead predict such characteristics by reference to features 102 and usefulness maps 180 in library 170.

After usefulness map(s) 180 are generated for target feature(s) 176, the flow can proceed to process P4 of selecting one or more SRAF insertion sites 108 for IC layout 100. In particular, modules 222 of layout adjustment system 220 can select one or more portions of candidate zone(s) 184 in usefulness map 180 as a position where SRAF(s) 104, 106 should appear in proposed IC layout 100. The selecting of SRAF insertion sites 108 in process P4 can be based on, e.g., user input based on usefulness map 180, calculating a position in candidate zone(s) 184 where SRAF(s) 104, 106 will offer the greatest improvement to printability of target feature 176, and/or other techniques or combinations of techniques.

Methods according to the disclosure can include, in process P5, adding target feature(s) 176 and the generated usefulness map(s) 180 (e.g., predicted usefulness map 198) to library 170. In process P5, modules 232 of training system 230 can input target feature(s) 176 and usefulness map(s) 180 to library 170 as data to further train ANN 174 for processing of other proposed IC layouts 100. Adding target feature(s) 176 and usefulness map(s) 180 to library 170 in process P5 can therefore provide continuous improvement and expansion of training data for ANN 174 with each execution of the present disclosure. To provide further efficiency and improvement, library 170 can be in communication with multiple IC modeling programs 206 and multiple ANN(s) 174 to accommodate various unprocessed features 102 in several proposed IC layouts 100.

In process P6, modules 222 of layout adjustment system 220 can insert new SRAFs 104, 106 into proposed IC layout 100 at SRAF insertion site(s) 108 selected in process P5. As discussed elsewhere herein, SRAF insertion site(s) 108 can be selected automatically to improve the printability of target feature(s) 176. Process P6 can be implemented, e.g., before fabrication device 150 creates fabricated circuit(s) 160 from proposed IC layout 100, thereby allowing IC modeling program 206 to directly edit proposed IC layout 100 to include SRAF(s) 104, 106 therein. The inserting of SRAF(S) 104, 106 into proposed IC layout 100 in process P6 can occur independently from adjustments to library 170, ANN 174 in other process steps described herein. Where applicable, the flow can optionally proceed to process P7 (shown in phantom) in which IC modeling program 206 submits proposed IC layout 100 to fabricating device 150 to yield one or more fabricated circuits 160 with fabricating device 150. In some cases, a user may thereafter analyze and/or extract fabricated circuit(s) 160 to further train ANN 174. In any case, the flow can conclude ("Done") after fabrication device 150 produces fabricated circuit(s) 160 from proposed IC layout 100.

The various processes discussed herein can, optionally, be executed in a looping fashion to generate usefulness maps 180 for multiple target features 176. Methods according to the disclosure can therefore include determining in process P8 whether library 170 is complete with respect to proposed IC layout 100. In this case, modules 222 of layout adjustment system 220 can determine whether any features 102 in proposed IC layout 100 are not represented in library 170. Where all features 102 have been processed as target features 176 for inserting new SRAFs 104, 106 (i.e., "Yes" at process P8), the flow can proceed to process P7, including submitting proposed IC layout 100 to fabrication device 150 as described herein. In cases where at least one other feature 102 has not been as target feature 176 to insert more SRAFs 104, 106 (i.e., "No" at process P8), the flow can return to process P2, including identifying one or more additional target features 176 and thereafter executing processes P3-P6 as discussed herein.

Figure 7:
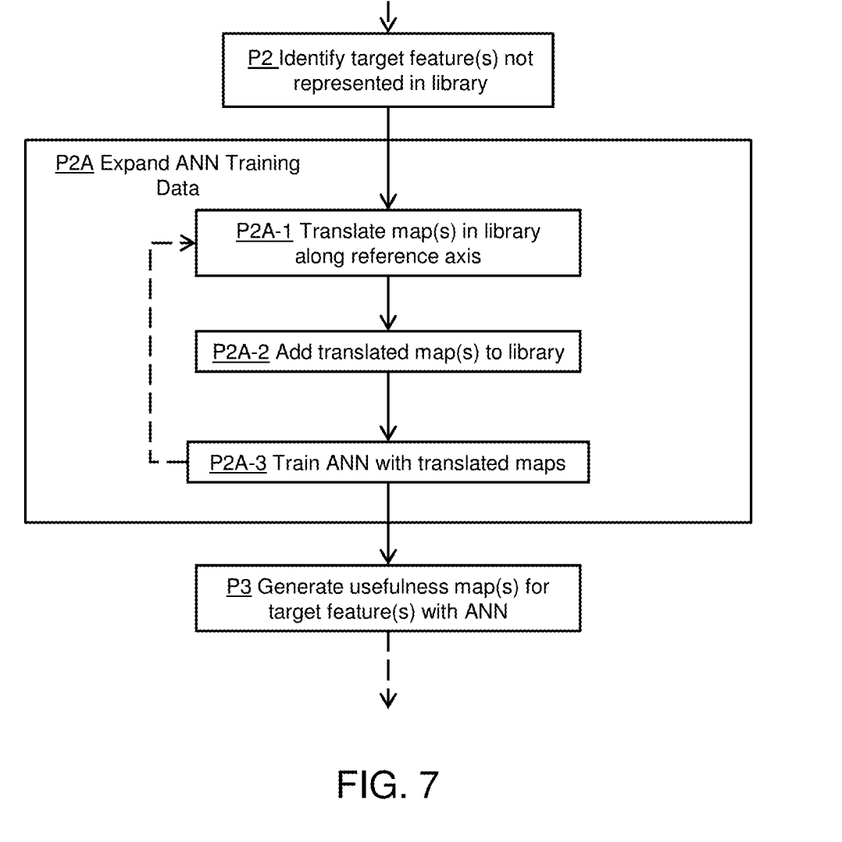
FIG. 7 is an example flow diagram showing processes for expanding ANN training data according to embodiments of the disclosure.

Referring to FIGS. 1, 4-5, and 7 together, embodiments of the disclosure can optionally include additional actions for training ANN 174. FIG. 7 depicts an additional process P2A of expanding ANN training data, e.g., implemented between processes P2 and P3 as discussed with reference to FIG. 6. It is understood that implementation of process P2A can alternatively occur between other process steps and/or simultaneously with other process steps where desired or applicable. Process P2A, as described herein, can automatically expand the size of library 170 to further train ANN 174 by modifying existing usefulness maps 180 to create new usefulness maps 180. Process P2A can include several sub-processes.

In process P2A-1, modules 232 of training system 230 can translate (i.e., move to a displaced position without further alterations) one or more usefulness maps 180 along one or more reference axes, e.g., in X-Y plane as shown in FIG. 4. The translating of usefulness maps 180 can be completed, e.g., by constructing at least part of an alternative IC layout in which one or more features 102 are moved to a different position. As discussed elsewhere herein, translational movement of features 102 in an X-Y plane may identically translate a corresponding usefulness map 180 for the translated feature 102. Where one or more translated features 102 cause corresponding usefulness map(s) 180 to at least partially overlap with each other, modules 232 of training system 230 can re-generate usefulness map(s) 180 for at least the overlapping portions, e.g., by addition, superposition, and/or other mathematical techniques for combining representations of SRAF effectiveness. In many cases, the translated usefulness map(s) 180 will be identical to the non-translated usefulness map(s) 180 apart from being in a different position (e.g., in plane X-Y).

In process P2A-2, training system 230 (e.g., via modules 232) adds the translated usefulness map(s) 180 to library 170 as new usefulness maps for training ANN 174. It is thus understood that process P2A-1 can include one or more usefulness map(s) 180 in X-Y space to new positions and adding the translated usefulness map(s) 180 to library 170 in process P2A-2, such that even a single usefulness map 180 can provide several new usefulness maps 180. The flow can then proceed to process P2A-3, which includes training ANN 174 with the translated usefulness maps 180 from process P2A-2, e.g., by inputting the translated usefulness maps 180 to various input nodes to adjust processes implemented by hidden layers 194 (FIG. 3) and/or other portions of ANN 174. Processes P2A-1 through P2A-3 can optionally be re-executed in a looping fashion (as shown by the corresponding phantom process flow) to produce additional translated usefulness maps 180 from existing usefulness maps 180 in library 170. After ANN 174 has been trained with additional usefulness maps 180 as discussed herein, the method can return to other processes described herein, e.g., process P3 of generating usefulness maps 180 from target feature(s) 176.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying a target feature in an integrated circuit (IC) layout not represented in a library, the library including a plurality of sub-resolution assist feature (SRAF) usefulness maps corresponding to a plurality of features and SRAFs in the IC layout;
   generating a usefulness map for the target feature with an artificial neural network (ANN), the generating being based on the target feature and the plurality of SRAF usefulness maps in the library, wherein the usefulness map includes at least one candidate zone where an SRAF will increase printability of the target feature, and at least one excluded zone where an SRAF will decrease printability of the target feature;
   translating one of the plurality of SRAF usefulness maps along at least one reference axis to yield a translated SRAF usefulness map;
   adding the target feature, the translated SRAF usefulness map and the generated usefulness map to the library;
   selecting a candidate zone in the generated usefulness map as an SRAF insertion site for the target feature;
   inserting an SRAF for the target feature into the IC layout at the selected SRAF insertion site; and
   manufacturing a circuit using the IC layout.

2. The method of claim 1, further comprising:
   training the ANN to generate the usefulness map for the target feature based on the translated SRAF usefulness map, the target feature, and the plurality of SRAF usefulness maps in the library.

3. The method of claim 2, wherein the at least one reference axis comprises one of an x-axis and a y-axis in a plan view of the IC layout.

4. The method of claim 1, wherein at least one SRAF usefulness map of the plurality of SRAF usefulness maps is based on a manufactured IC structure formed from the IC layout.

5. The method of claim 1, further comprising determining a completeness of the library based on features of the IC layout represented in the library.

6. The method of claim 1, wherein the ANN is a fully connected multilayer perceptron ANN.

7. The method of claim 1, wherein the ANN is a convolutional ANN.

8. The method of claim 1, wherein the library further includes SRAF usefulness maps for a plurality of distinct IC layouts, the plurality of SRAF usefulness maps includes at least one feature different from the target feature, and the target feature is not included within the plurality of distinct IC layouts.

9. A computer program product stored on a computer readable storage medium, the computer program product comprising program code, which, when being executed by at least one computing device, causes the at least one computing device to:
   identify a target feature in an integrated circuit (IC) layout not represented in a library, the library including a plurality of sub-resolution assist feature (SRAF) usefulness maps corresponding to a plurality of features and SRAFs in the IC layout;
   generate a usefulness map for the target feature with an artificial neural network (ANN), the generating being based on the target feature and the plurality of SRAF usefulness maps in the library, wherein the usefulness map includes at least one candidate zone where an SRAF will increase printability of the target feature, and at least one excluded zone where an SRAF will decrease printability of the target feature;
   translating one of the plurality of SRAF usefulness maps along at least one reference axis to yield a translated SRAF usefulness map;
   add the target feature, the translated SRAF usefulness map, and the generated usefulness map to the library;
   select a candidate zone in the generated usefulness map as an SRAF insertion site for the target feature;
   insert an SRAF for the target feature into the IC layout at the selected SRAF insertion site; and
   instruct a manufacturing device to manufacture a circuit using the IC layout.

10. The computer program product of claim 9, the computer program product further comprising program code for causing the at least one computing device to:
    train the ANN to generate the usefulness map for the target feature based on the translated SRAF usefulness map, the target feature, and the plurality of SRAF usefulness maps in the library.

11. The computer program product of claim 10, wherein the at least one reference axis comprises one of an x-axis and a y-axis in a plan view of the IC layout.

12. The computer program product of claim 9, wherein at least one SRAF usefulness map of the plurality of SRAF usefulness maps is generated from a manufactured IC structure.

13. The computer program product of claim 9, wherein the ANN is one of a fully connected multilayer perceptron ANN or a convolutional ANN.

14. The computer program product of claim 9, the computer program product further comprising program code for causing the at least one computing device to determine a completeness of the library based on features in the IC layout represented in the library.

15. The computer program product of claim 9, wherein the library further includes SRAF usefulness maps pertaining to a plurality of distinct IC layouts, the plurality of SRAF usefulness maps includes at least one feature different from the target feature, and the target feature is not included within the plurality of distinct IC layouts.

16. A system comprising:
    at least one computing device configured to perform a method by performing actions including:
       identify a target feature in an integrated circuit (IC) layout not represented in a library, the library including a plurality of sub-resolution assist feature (SRAF) usefulness maps corresponding to a plurality of features and SRAFs in the IC layout;
       generate a usefulness map for the target feature with an artificial neural network (ANN), the generating being based on the target feature and the plurality of SRAF usefulness maps in the library, wherein the usefulness map includes at least one candidate zone where an SRAF will increase printability of the target feature, and at least one excluded zone where an SRAF will decrease printability of the target feature;

translate one of the plurality of SRAF usefulness maps along at least one reference axis to yield a translated SRAF usefulness map;

add the target feature, the translated SRAF usefulness map, and the generated usefulness map to the library;

select a candidate zone in the generated usefulness map as an SRAF insertion site for the target feature; and insert an SRAF for the target feature into the IC layout at the selected SRAF insertion site; and a fabricating device configured to manufacture a circuit using the IC layout.

17. The system of claim 16, wherein the at least one computing device is further configured to:

train the ANN to generate the usefulness map for the target feature based on the translated SRAF usefulness map, the target feature, and the plurality of SRAF usefulness maps in the library.

18. The system of claim 17, wherein the at least one computing device is further configured to determine a completeness of the library based on a number of features in the IC layout represented in the library.

19. The system of claim 16, wherein the ANN comprises one of a fully connected multilayer perceptron ANN, or a convolutional ANN.

20. The system of claim 16, wherein the plurality of SRAF usefulness maps includes at least one feature different from the target feature, and the target feature is not included within the plurality of distinct IC layouts.

* * * * *